Patented Aug. 24, 1943

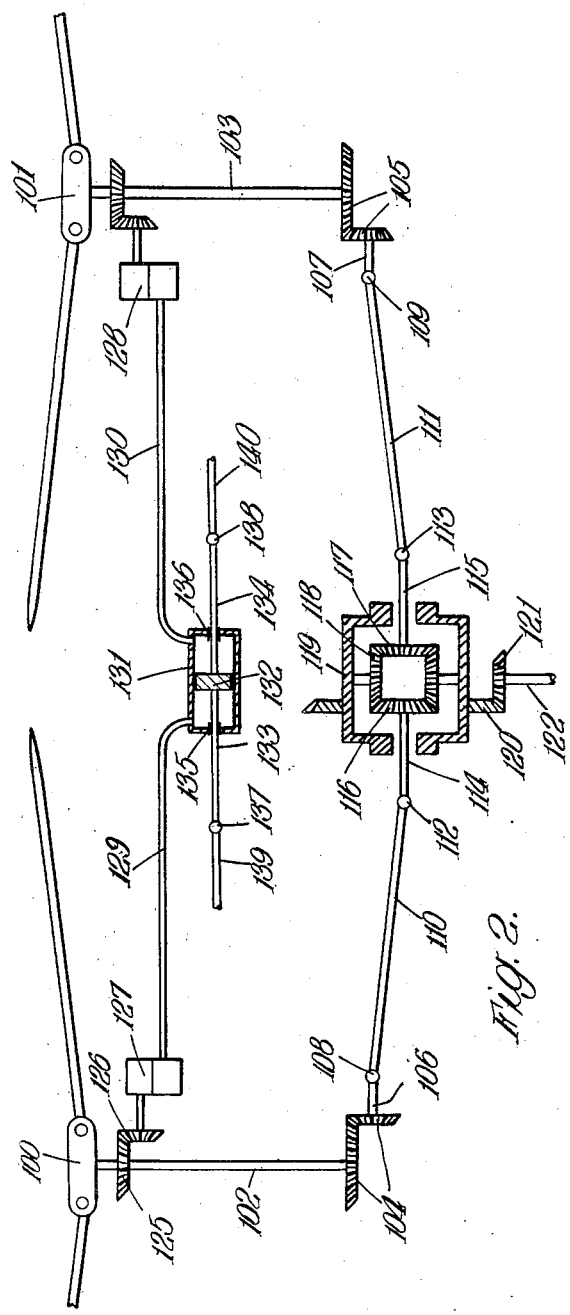

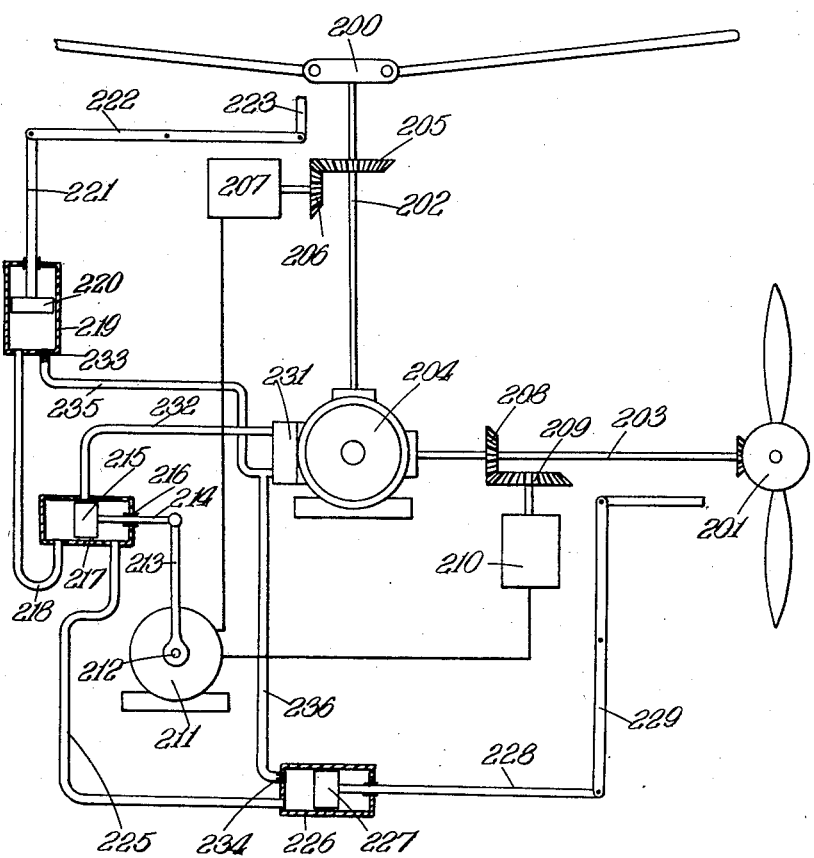

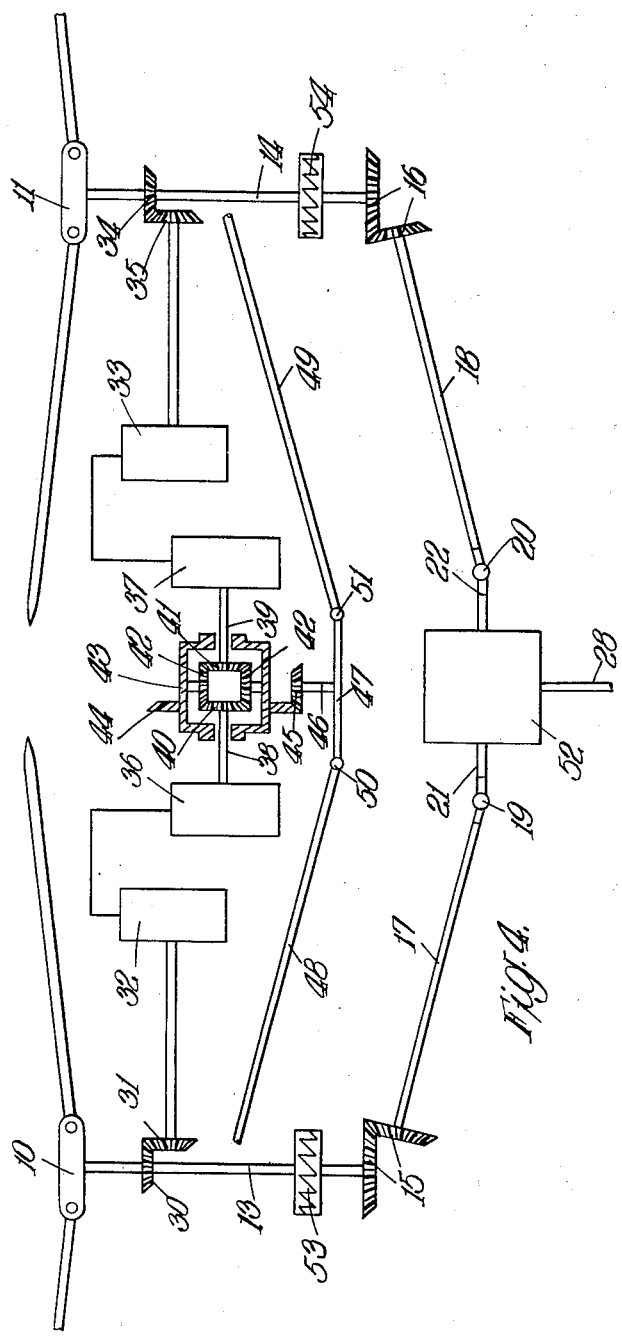

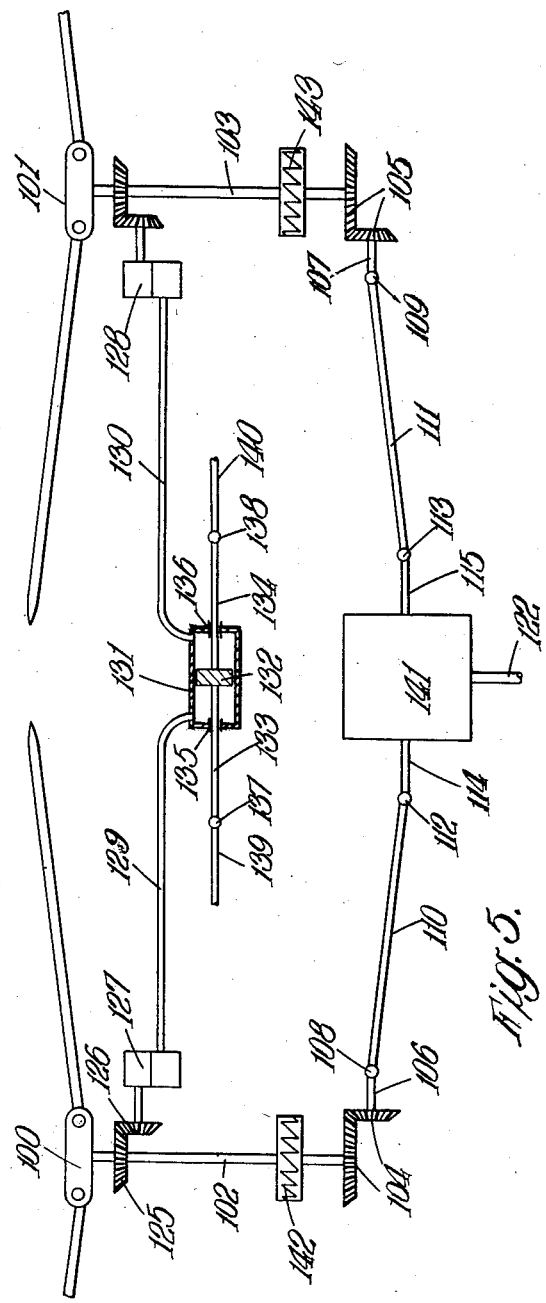

2,327,370

UNITED STATES PATENT OFFICE 2,327,370

ROTARY WING AIRCRAFT

Cyril George Pullin, Genista, Newton Mearns, Scotland, assignor to Autogiro Company of America, Willow Grove, Pa., a corporation of Delaware Application May 25, 1940, Serial No. 337,170
In Great Britain March 9, 1939

16 Claims. (Cl. 244—17)

The present invention relates to rotative wing aircraft having either two or more rotors disposed on opposite sides of the axis of symmetry of the aircraft or having a sustaining rotor and a propulsive airscrew, the latter being offset to counteract the reaction torque of the rotor during normal (power driven) flight. In the former case the rotors may either be power driven through a balance gear or be autorotative during normal flight while in the latter case the rotor and airscrew are normally driven from a power unit through a balance gear which divides the torque of the power unit in a constant ratio between the rotor and airscrew.

With aircraft having a pair of rotors driven from a power unit through a differential gear for balancing the rotor torques or from separate power units or having rotors which are autorotative during normal flight it is possible for the speeds of the rotors to differ considerably, but I have found that a wide difference in speed of the rotors is undesirable. Similarly in the case of an aircraft having a sustaining rotor and propulsive airscrew offset from the longitudinal axis of the aircraft and driven through a differential gear which divides the power unit torque in a given ratio between them it is desirable that the ratio of the speeds of the rotor and airscrew should be maintained constant within fairly close limits to enable the thrust moment of the airscrew accurately to counteract the rotor torque reaction.

According to the present invention each rotor or the rotor and the airscrew, as the case may be, drives means giving an output which varies according to speed, said means being coupled to a differential unit which reacts to any difference between the outputs of said means to cause pitch change of the rotors or of the rotor and airscrew in a sense tending to reduce such difference in speed of the rotors or variation of the ratio of the speeds of the rotor and airscrew from the normal.

Three constructional embodiments in accordance with this invention are illustrated by way of example in the accompanying drawings in which:

Fig. 2 is a similar view showing a modified arrangement in which an oil pump is associated with each rotor;

Fig. 3 shows the invention as applied to an aircraft having a sustaining rotor and a propulsive airscrew offset from the axis of symmetry of the aircraft, an electrical generator being associated with the rotor and with the airscrew;

Fig. 4 is a view similar to Fig. 1 showing the invention as applied to an aircraft having a pair of sustaining rotors which are operated autorotatively during normal flight; and Fig. 5 is a view similar to Fig. 2 showing a modified arrangement for use with autorotative sustaining rotors.

Figure 1:
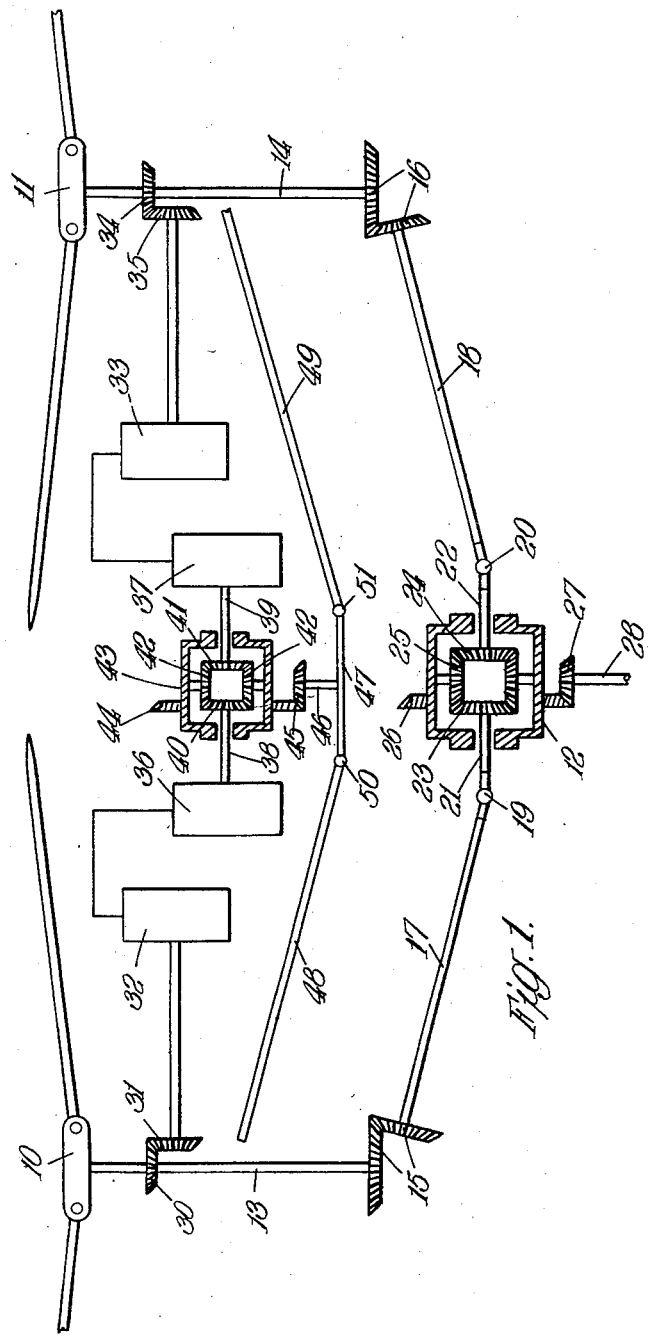
Fig. 1 is a diagrammatic view showing the invention as applied to an aircraft having a pair of sustaining rotors, each having associated with it an electrical generator and normally power driven during flight from a common power unit through a differential balance gear.

Referring to Fig. 1. An aircraft has a pair of sustaining rotors 10, 11 driven from a differential balance gear 12 through shafts 13 and 14, bevel drives 15 and 16, further shafts 17 and 18 and universal joints 19 and 20 respectively. The universal joints 19 and 20 are carried by stub shafts 21 and 22 having at their inner ends bevel wheels 23 and 24 meshing with wheels 25 journalled in the casing 12 of the differential balance gear. The casing carries a bevel wheel 26 meshing with a bevel pinion 27 on the shaft 28 of a power unit (not shown).

Driven through a bevel drive 30, 31 from the shaft 13 is an alternating current generator 32 while a similar generator 33 is driven by a bevel drive 34, 35 from the shaft 14 of the other rotor. The generators 32 and 33 are respectively coupled to synchronous motors 36, 37 having shafts 38 and 39 carrying at their inner ends bevel pinions 40, 41 meshing with pinions 42 journalled in the casing 43 of a second differential gear. The shafts 38 and 39 are arranged to rotate in opposite directions. The casing carries a bevel wheel 44 meshing with a bevel pinion 45 of a shaft 46, the lower end of which carries a cross arm 47 to the two ends of which rods 48 and 49 are connected by universal joints 50 and 51. The rods 48 and 49 are coupled to the pitch change controls (not illustrated) of the rotors 10 and 11 respectively.

When the speeds of the rotors 10 and 11 are equal, the speeds of the synchronous motors 36 and 37 are also equal, so that there is no tendency for the casing of the differential gear 43 to turn. Moreover, should the speed of the rotor 10 exceed that of the rotor 11, the synchronous motor 36 will be driven at a speed greater than that of the motor 37 bringing about rotation of the casing 43 causing rotation of the bevel pinion 45 coupled by the rods 48 and 49 to the pitch change controls of the rotors. The coupling between the arm 47 carried by the bevel pinion 45 and the pitch change controls of the rotors is such that turning of the pinion 45 causes alteration of the pitch of the rotors in opposite senses to increase the pitch of the rotor running at the higher speed and decreasing the pitch of the rotor running at the lower speed, thereby tending to reduce speed difference.

Fig. 4 shows diagrammatically an arrangement similar to that shown in Fig. 1 but as applied to a gyroplane (i. e. an aircraft in which the sustaining rotors are operated autorotatively during normal flight). In this arrangement the power unit driving the shaft 28 is used to drive the rotors through a gearbox 52 only during starting of the rotors and not during flight. If desired, the gearbox can be a differential balance gear as described with reference to Fig. 1, but a rigid drive is equally suitable for this purpose. A freewheel clutch 53 is included in the transmission to the rotor 10, being disposed between the bevel drive 15 and the shaft 13 from which the bevel drive 30, 31 is taken to the alternating current generator 32. A free-wheel clutch 54 is similarly arranged in the transmission to the rotor 11.

When the rotors have been started by driving them from the power unit, the drive is cut off and the freewheel clutches 53 and 54 are brought into operation, allowing the rotors to revolve autorotatively. Since the generators 32 and 33 are driven from the shafts 13 and 14 at points above the freewheel clutches 53 and 54 they will still respond to speeds of the rotors and operate through the motors 36 and 37 and other mechanism as described with reference to Fig. 1 to maintain equality of the rotor speeds.

In the arrangement illustrated in Fig. 2, an aircraft has a pair of sustaining rotors 100, 101 driven through shafts 102 and 103 and bevel drives 104 and 105 from stub shafts 106, 107 coupled by universal joints 108 and 109 to drive shafts 110 and 111 driven through universal joints 112 and 113 from a common differential balance gear. The differential balance gear comprises shafts 114 and 115 coupled respectively to the rotors 100 and 101 and carrying bevel pinions 116 and 117 meshing with pinions 118 journalled in the casing 119 of the balance gear. This casing 119 has mounted on it a bevel wheel 120 which is driven by a bevel wheel 121 on the shaft 122 of a power unit (not shown).

A bevel wheel 125 on the shaft 102 of the rotor 100 meshes with a further wheel 126 which drives an oil pump 127. A pump 128 is similarly driven from the shaft 103 of the rotor 101. The pumps 127 and 128 are of a type giving an output pressure which varies according to the speed at which the pump is driven. They are coupled by pipes 129 and 130 to opposite ends of a relay cylinder 131 having a double acting piston 132 having rods 133 and 134 passing through glands 135 and 136 in the ends of the relay cylinder. Universal joints 137 and 138 couple the rods 133 and 134 respectively to rods 139 and 140 which extend to the pitch control mechanism of the rotors 100 and 101 respectively. This pitch change mechanism is not illustrated but may be of any suitable type.

When the rotors are running at the same speed the output pressures of the pumps 127 and 128 are equal, so that the pressures on opposite sides of the relay piston 132 are balanced. Should the speed of the rotor 100 exceed that of the rotor 101, the oil pressure of the pump 127 will exceed that of the pump 128 so that the piston 132 will be urged towards the right, as seen in Fig. 2. The coupling between the relay piston and the pitch change controls of the rotors is such that this movement of the relay piston will cause increase of the pitch of the rotor 100 while the pitch of the rotor 101 is reduced. Owing to its increased pitch, the rotor 100 will absorb more torque tending to slow it down, while the rotor 101, in the reduced pitch position, will absorb less torque and so tend to speed up, thereby maintaining substantial equality of the speeds of the two rotors.

Fig. 5 shows control mechanism similar to that of Fig. 2 as applied to a gyroplane, the rotors only being power driven for starting purposes. In this arrangement the transmission shafts 114 and 115 are driven from the shaft 122 of the power unit through a gearbox 141 which drives the shafts 114 and 115 at equal speeds. Freewheel clutches 142 and 143 are disposed between the bevel drives 104 and 105 and the shafts 102, 103 driving the rotors 100 and 101 respectively. Since the oil pumps 127 and 128 are driven from points nearer the rotors 100 and 101 than the freewheel clutches they will respond to the rotor speeds when the latter are over-running the drive from the power unit as will be the case during normal flight. The arrangement and operation of the control mechanism for changing the rotor pitches to maintain equality of speed are as described with reference to Fig. 2.

Fig. 3 shows this invention applied to an aircraft having a sustaining rotor 200 and a propulsive airscrew 201, the latter being offset from the axis of symmetry of the aircraft by an amount such that the torque reaction of the rotor during normal flight conditions is substantially counteracted by the thrust moment of the airscrew. The rotor and airscrew are driven through shafts 202 and 203 respectively from a balance gear 204 which may be of similar construction to the balance gear 12 illustrated in Fig. 1 and which is in turn driven from a power unit (not shown).

Mounted on the rotor drive shaft 202 is a bevel pinion 205 meshing with a smaller pinion 206 driving an electrical generator 207. A bevel pinion 208 on the airscrew drive shaft 203 drives a larger bevel pinion 209 on the shaft of a second electrical generator 210. The ratios of the bevel gears 205, 206 and 208, 209 are chosen so that the speeds of the generators 207 and 210 are equal, thus allowing identical generators to be used. Alternatively if the two generators are not driven at the same speed they must be arranged to provide outputs of similar voltage and/or frequency when the airscrew and rotor are revolving at their normal speeds.

The outputs from the generators 207 and 210 are taken to a differential electrical unit 211 which has a spindle 212 carrying an arm 213 pivotally connected to a rod 214 which is coupled to a piston 215 and passes through a gland 216 in the cylinder 217 of a piston valve. A pipe 218 extends from the space at one side of the piston 215 to a relay cylinder 219 having a piston 220 joined to a rod 221 pivotally connected at its upper end to a lever 222, the opposite end of which is coupled by a link 223 to a pitch control (not illustrated) of the rotor 200. A pipe 225 extends from the space at the other side of the piston 215 of the piston valve to a second relay cylinder 226 having a piston 227 mounted on a rod 228 pivotally connected to a lever 229, the other end of which is coupled by a link to the pitch control (not illustrated) of the offset airscrew 201.

When the differential electrical unit 211 responds to a difference between the outputs of the generators 207 and 210, the piston 215 of the piston valve is moved, allowing fluid under pressure to pass from a pump 231 driven from the power unit through a pipe 232 to one side or other of the piston 215 and thence via the pipe 218 to the relay cylinder 219 or via the pipe 225 to the relay cylinder 226 to cause an increase in the pitch of either the rotor or the airscrew in a sense tending to restore the correct ratio between the speed of the rotor and that of the airscrew. The relay cylinders 219 and 226 are provided with bleeder valves 233 and 234 respectively joined by pipes 235 and 236 to the low pressure side of the pump 231. These bleeder valves allow the fluid pressure in the cylinders 219 and 226 to be reduced gradually to return the pitches of the rotor and airscrew to their normal values.

With respect to the appended claims, it is to be noted that unless otherwise qualified, the term "rotor" as used in the claims is to be considered as comprehending sustaining rotors and propulsive and other airscrews.

What I claim is:

1. In an aircraft, two rotors, on non-concentric axes of rotation so disposed that when power-driven they set up appreciable opposing moments on the craft, and mechanism responsive to rotor drive conditions indicative of differential variations of said moments to impose a compensating action upon at least one of said rotors independently of its power drive.

2. In an aircraft, two rotors, on non-concentric axes of rotation so disposed that when power-driven they set up appreciable opposing moments on the craft, and governor mechanism responsive to differential variations of the speeds of said rotors to impose a compensating action upon at least one of them independently of its power drive.

3. In an aircraft, two rotors, on non-concentric axes of rotation so disposed that when power-driven they set up appreciable opposing moments on the craft, at least one of said rotors being of variable pitch, and mechanism responsive to rotor drive conditions indicative of differential variations of said moments to impose a compensating rotor pitch change.

4. In an aircraft, two variable-pitch rotors, on non-concentric axes of rotation, so disposed that when power-driven they set up appreciable opposing moments on the craft, and governor mechanism responsive to differential variations of the speeds of said rotors to effect compensating pitch changes thereof.

5. In an aircraft, two variable-pitch rotors, on non-concentric axes of rotation so disposed that when power-driven they set up appreciable opposing moments on the craft, two devices each associated respectively with one of said two rotors and having outputs varying with the respective speeds of said rotors, and a differential unit responsive to differences in said outputs and acting to effect compensating pitch changes of said rotors.

6. In an aircraft, two rotors, on non-concentric axes of rotation so disposed that when power-driven they set up appreciable opposing moments on the craft, at least one of said rotors being of variable pitch, mechanism responsive to differential variations of said moments to impose a compensating rotor pitch change, and a differential power drive to said two rotors.

7. In an aircraft, two rotors, at least one of which is a sustaining rotor, positioned on non-concentric axes of rotation, so disposed that when power-driven they set up appreciable opposing moments on the craft, power drive means for said rotors adapted to effect an approximate balance of said moments under a predetermined flight condition, and mechanism responsive to rotor drive conditions indicative of differential variations of said moments to impose a compensating action upon at least one of said rotors independently of its power drive.

8. In an aircraft, a pair of variable pitch sustaining rotors, a pair of electric generators each driven respectively from one of said rotors, two synchronous motors driven respectively from the two generators, and a differential gear responsive to difference in speed of the motors operatively coupled to the rotors to cause pitch change in a sense tending to reduce difference in the speeds of the rotors.

9. In an aircraft, a pair of variable-pitch sustaining rotors, a pair of oil pumps each driven respectively from one of said rotors and giving an output varying with speed, and a relay cylinder having a piston which responds to difference in the outputs of the oil pumps operatively coupled to each of the rotors to cause pitch change in a sense tending to reduce difference in the speeds of the rotors.

10. In an aircraft, a pair of variable-pitch sustaining rotors, a power unit, a power transmission from the power unit to each of the rotors, differential gearing in said transmission for equalising the torques applied to the rotors, a pair of alternating current generators each driven respectively from one of said rotors, two synchronous motors driven respectively from the two generators, and differential gear responsive to difference in speed of the motors operatively coupled to the rotors to cause pitch change in a sense tending to reduce difference in the speeds of the rotors.

11. In a aircraft, a sustaining rotor and a propulsive airscrew which is offset from the longitudinal axis of the aircraft, at least one of same being of variable pitch, a power unit, a power transmission from the power unit to said rotor and said airscrew, differential gearing included in said power transmission for dividing the torque from the power unit equally between the rotor and airscrew, two means driven respectively from the rotor and the airscrew and giving an output which varies with speed, a differential unit which responds to difference between the outputs of said means operative to maintain substantially constant the ratio of the speeds of the rotor and airscrew by controlled pitch change, the constructional offset of the airscrew being such that the airscrew thrust moment substantially counteracts the rotor torque reaction during straight flight.

12. In an aircraft having a pair of side-by-side variable pitch sustaining rotors adapted to be driven in opposite directions and engine means for driving the rotors, power transmission means between the engine means and the rotors including differential gearing for equalizing the torque as between the rotors, and pitch control mechanism for inversely varying the mean pitch of the two rotors in accordance with relative variation in their R. P. M., the pitch control mechanism including a differential gearing the differential gears of which are respectively actuated by the two rotors, and pitch control linkage associated with the differential cage and providing pitch control in a sense such that relative increase of R. P. M. of one rotor causes increase of mean pitch of that rotor and decrease of mean pitch of the other rotor.

13. In an aircraft having a pair of side-by-side variable pitch sustaining rotors adapted to be driven in opposite directions and engine means for driving the rotors, power transmission means between the engine means and the rotors including differential gearing for equalizing the torque as between the rotors, and pitch control mechanism for inversely varying the mean pitch of the two rotors in accordance with relative variation in their R. P. M., the pitch control mechanism including for each rotor a fluid pressure pump driven thereby, and a fluid pressure responsive control device actuated by said pumps and having pitch-control connections so coupled to said variable-pitch rotors as to effect increase of the mean pitch of one rotor upon increase in R. P. M. of that rotor and decrease of the mean pitch of the other rotor upon increase in R. P. M. of the first rotor.

14. In an aircraft having a pair of side-by-side variable pitch sustaining rotors adapted to be driven in opposte directions and engine means for driving the rotors, driving connections from the engine means to the rotors including gearing and for each rotor an overrunning clutch disposed in the driving connections between the respective rotor and said gearing, and pitch control mechanism for inversely varying the mean pitch of the two rotors in accordance with relative variation in their R. P. M., the pitch control mechanism including a differential gearing, drive means for the differential gears of said gearing, the respective drive means being coupled one to one rotor and the other to the other rotor for actuation in synchronism therewith, and pitch control linkage associated with the differential cage and providing pitch control in a sense such that relative increase of R. P. M. of one rotor causes increase of mean pitch of that rotor and decrease of mean pitch of the other rotor.

15. In an aircraft having a pair of side-by-side variable pitch sustaining rotors adapted to be driven in opposite directions and engine means for driving the rotors, driving connections from the engine means to the rotors including gearing and for each rotor an overrunning clutch disposed in the driving connections between the respective rotor and said gearing, and pitch control mechanism for inversely varying the mean pitch of the two rotors in accordance with relative variation in their R. P. M., the pitch control mechanism including for each rotor a fluid pressure pump driven thereby in synchronism therewith and a fluid pressure responsive control device actuated by said pumps and having pitch-control connections so coupled to said variable-pitch rotors as to effect increase of the mean pitch of one rotor upon increase in R. P. M. of that rotor and decrease of the mean pitch of the other rotor upon increase in R. P. M. of the first rotor.

16. In an aircraft having a pair of variable pitch bladed rotors adapted to be driven and one of which is adapted to counteract the driving torque of the other, and having engine means for driving said rotors, power transmission means incorporating differential gearing for dividing the torque between the rotors and further incorporating for each rotor, an overrunning clutch disposed in the line of transmission between the rotor and the differential gearing, and governor mechanism for control of blade pitch, the governor mechanism including, for each rotor, control means actuated by the rotor drive transmission for that rotor between the latter and the overrunning clutch therefor, and constructed to effect inverse change in mean blade pitch of the two rotors in accordance with relative change in R. P. M. of the two rotors in a sense such that increase in relative R. P. M. of one rotor causes increase of mean blade pitch of that rotor and decrease of mean blade pitch of the other rotor.

CYRIL GEORGE PULLIN.